(12) United States Patent
Paweletz et al.

(10) Patent No.: US 6,412,266 B2
(45) Date of Patent: Jul. 2, 2002

(54) SPIN MACHINE WITH SEVERAL SINGLE DRIVES

(75) Inventors: Anton Paweletz, Fellbach; Bernd Bahlmann, Schrobenhausen; Erich Bock, Wettstetten; Edmund Schuller, Ingolstadt, all of (DE)

(73) Assignee: Rieter Ingolstadt Spinnereimaschinenbau AG, Ingolstadt (DE)

( * ) Notice: Subject to any disclaimer, the term of this patent is extended or adjusted under 35 U.S.C. 154(b) by 0 days.

(21) Appl. No.: 09/747,789

(22) Filed: Dec. 22, 2000

(30) Foreign Application Priority Data

Dec. 29, 1999 (DE) .......................................... 199 63 472

(51) Int. Cl.[7] ................................................ D01H 4/42
(52) U.S. Cl. ............................................ 57/263; 57/400
(58) Field of Search ........................ 57/263, 264, 406, 57/408, 412, 92, 93, 97, 100

(56) References Cited

U.S. PATENT DOCUMENTS

| | | | | |
|---|---|---|---|---|
| 3,910,023 A | * | 10/1975 | Muller ...................... 57/58.95 |
| 4,165,603 A | * | 8/1979 | Lattion ........................ 57/296 |
| 4,244,176 A | * | 1/1981 | Shimizu et al. ................ 57/295 |
| 4,592,198 A | * | 6/1986 | Stahlecker .................... 57/401 |
| 4,844,358 A | * | 7/1989 | Kamp ....................... 242/35.5 |
| 5,419,111 A | * | 5/1995 | Wassenhover et al. ......... 57/407 |
| 5,509,261 A | * | 4/1996 | Wassenhover et al. ......... 57/263 |

FOREIGN PATENT DOCUMENTS

| | | | |
|---|---|---|---|
| DE | 22358686 | | 1/1974 |
| EP | 385530 | * | 9/1990 ................... 57/295 |

OTHER PUBLICATIONS

Textilpraxis International article entitled Maschinen des Jahres, pp. 151 & 152.
German Search Report Dated May 11, 2000.

* cited by examiner

Primary Examiner—Danny Worrell
(74) Attorney, Agent, or Firm—Dority & Manning

(57) ABSTRACT

In a spinning machine with at least one spinning station possessing a feed drum, driven by a single drive, a disintegrator, a rotor, a withdrawal roll and a spool roll, provisions have been made that the spinning station has an additional single drive respectively for the withdrawal roll and/or the spool roll and/or a paraffin roll. The speed of rotation ratio of the single drives can be preset to specified values.

18 Claims, 1 Drawing Sheet

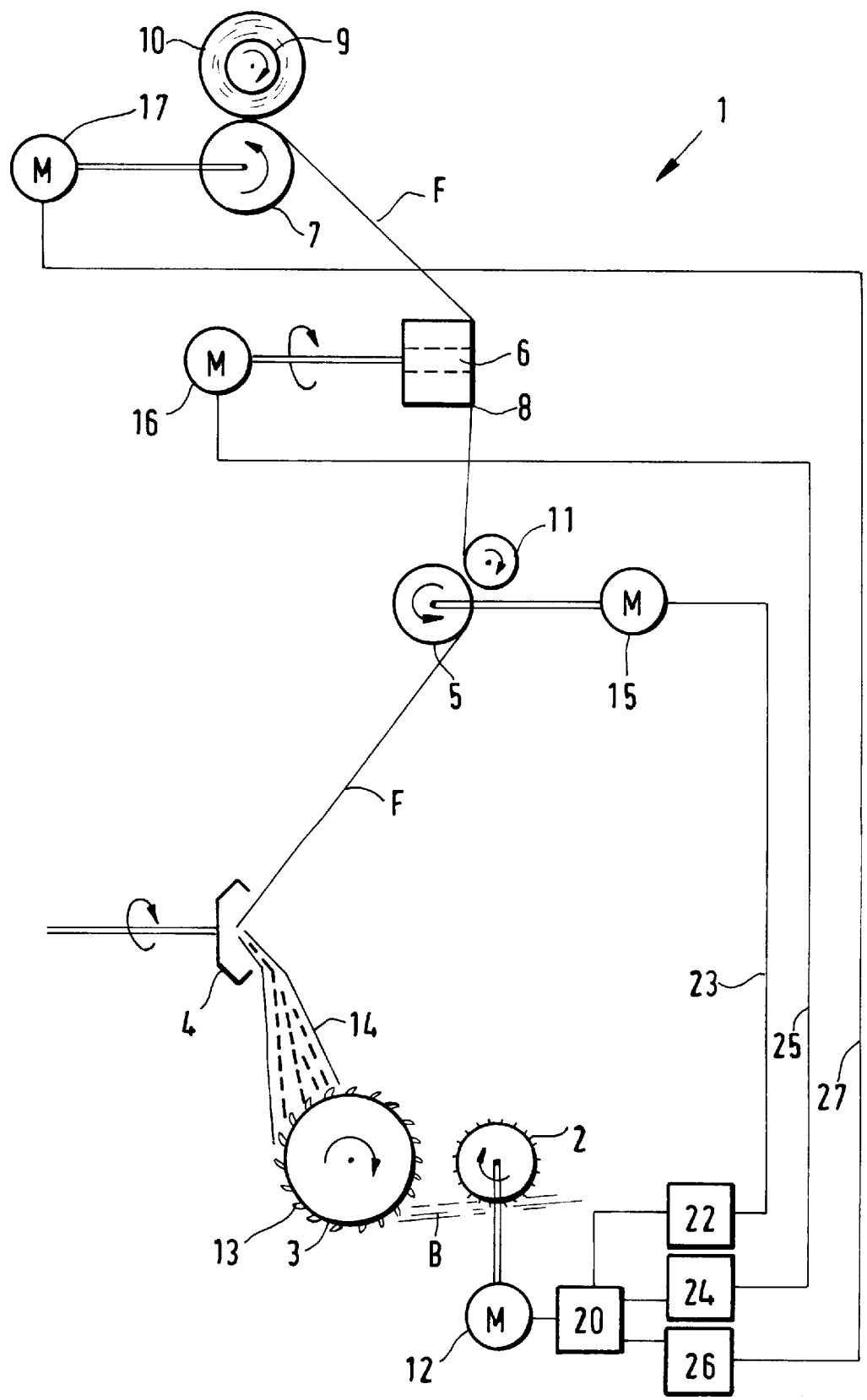

SPIN MACHINE WITH SEVERAL SINGLE DRIVES

The invention concerns a spinning machine with at least one spinning station, which station possesses a feed drum driven by a single drive, a disintegrating roll, a rotor, a withdrawal roll and a spool roll.

EP 0 385 530 discloses such a spinning machine, in which the feed drum of each spinning position of an open-end spinning machine is driven by means of a stepping motor. A control system with an associated computer regulates the corresponding stepping motor in each spinning machine in accord with its direction of rotation, its speed of rotation and the angular position of the drive, and thereby also the feed drum. A control system for each of the stepping motors is advantageous, so that the necessary precision in regard to the feed of the fiber band is assured.

In the conventional spinning machines, normally, the rotating elements which follow the feed drum in the direction of the band movement, for example, the rotor, are centrally driven by means of motors provided on an end of the spinning machine. In order to achieve the necessary correlation of the speed of rotation, for instance, of the feed roll, the withdrawal roll, and the spool roll, electrically controlled, mechanical gear drives are provided. By this means, each spinning station can produce constant yarn quality where yarn diameter and strength are concerned. Such gear drives possess, however, a great number of points of abrasion, which give rise to a relatively substantial demand of expense and maintenance time. Additionally, a relatively large startup momentum can be attributed to these gear drives. Where the necessary electrical control is concerned, considerable costs are involved in its wiring and installation.

OBJECTS AND SUMMARY OF THE INVENTION

Thus, it is a principal object of the present invention to make available a spinning machine in which is made possible a simple, and therefore precise, drive of the individual rotational elements of a spinning station. Additional objects and advantages of the invention will be set forth in part in the following description or may be obvious from the description, or may be learned through practice of the invention.

This purpose is achieved by the spinning station exhibiting additional single drives, respectively for the withdrawal roll, and/or the spool roll, and/or the waxing roll, and the rotational ratios of the single drives being set to specification.

The advantage of the invention can be particularly seen in that—besides each feed drum—an individual drive has been assigned to each withdrawal roll, and/or to each spool roll, and/or to each waxing roll. Since the rotational ratios of the individual drives of each spinning station can be specified, an optimized correlation in regard to synchronization, operational life, and rotational speed is assured. Furthermore, by means of the installation of the single drives, expensive and damage-prone gear drive construction is avoided, which otherwise would extend itself over the entire length of the spinning machine. Another advantage is that a very low degree of nominal torque is present with this single drive because of the small friction to which the individual drives are exposed. Especially, no torsional delays occur upon the startup of the respective rotational elements of the spinning stations, which are situated remotely from the central motor.

A single drive, for example, is also advantageous for the withdrawal roll so that the spinning startup process is made substantially easier, since this roll upon spinning startup is driven in reverse direction.

Advantageously, one of the individual drives serves as a lead motor. This lead motor has a specified guiding rotational speed or a specified guide frequency, which is related to the rotational speed of at least one single drive, and preferably, where multiple drives are concerned, the rotational speeds of all other single drives. In this manner, the RPM of all other single drives refers back to the lead drive and the rotational speeds of the other drives can thus be preset.

Advantageously, the feed motor of the feed drum is designated to be the guide motor, since, first, it rotates at a relatively low rotational speed (1–150 RPM) and, second, it must hold to the currently set rotational speed with great precision. Even small deviations lead to an undesirable variation of the set values of the thread to be spun. Although the single drive of the feed drum is chosen as the lead motor, this is not dependent upon the guidelines of other drives. Much more, the rotational speed of the lead motor can be directly and precisely adjusted. Because of the mentioned achievable exactness of its rotational speed, with an appropriate ratio control, a uniform torque for the other single drives is possible in all RPM ranges.

In an advantageous manner, for each spinning station, only one power control center for the regulation and the supply of electrical current to the individual drives need be provided. This design has the advantage of having the electronic circuitry only installed once, since this serves all individual drives per spinning station. On this account, long cable hook-ups from a central network, which then must run along the entire spinning machine, are no longer necessary.

In order to further reduce extensive constructional work and wiring, the power control center is placed on or near one of the individual drives. For instance, the power control center is screwed within or onto the housing of the feed drum. For the wiring thereof, corresponding borings are made through the housing. From the power control center, the additional control and power lines run to the other individual drives. The power control center can be provided at any of the other individual drives. For the eventual placement, the spatial conditions in the spinning station must be taken into consideration, so that, besides space saving, maintenance and cleaning services can be carried out with good accessibility.

The rotational speed of the other single drives in relation to the lead motor is advantageously effected by a frequency generator. For instance, there is respectively one frequency generator between the power control center to which the lead motor is connected and each of the single drives which is to be controlled. Alternatively, a single frequency generator can be furnished which transmits the rotational speed commands based on those of the lead motor to the individual drives by means of a frequency divider.

The invention allows a very fine subdividing of the motor rotation speed for the lead motor and/or the individual drives to be undertaken in micro-stepping, so that practically feedback-free operation of this motor is possible.

It is particularly advantageous to design at least one of the single drives as a stepping motor. Stepping motors have the advantage that they possess only very few parts and certainly no gear drives which are susceptible to wear and tear. Further, stepping motors possess the advantage that, while maintaining high efficiency, a relatively small inertial moment is in effect. Their shafts start to rotate without inrush current to the motor, that is, the motor can be quickly accelerated. In addition, stepping motors can be simply and precisely controlled and react very quickly to control commands. Further, stepping motors can be brought up to top speed on a continuous basis and in addition can be driven in the reverse direction. In regard to the economics, the stepping motor has no decisive disadvantage as compared to the synchronous motor. By the use of a stepping motor for the feed drum, this motor is preferable in a range of 1 to 150 RPM and can be run at a nearly constant torque.

Especially at a paraffin roll, which serves for the waxing of the yarn before the windup on the spool, the installation of a stepping motor is advantageous. Conventionally, for the drive of a paraffin roll, a synchronous motor is selected. Because of the mechanical gear drive in such a motor, relatively great frictional forces must be overcome during startup of the roll. To this purpose, the motor customarily calls for excess current. This characteristic increases the complexity of the control, i.e., the constant monitoring. Alternatively, a larger motor could be selected, which, however, would have an even greater demand for current at startup. By means of the selection of a stepping motor, all these problems are prevented.

For the feed drum of each spinning station, the use of a stepping motor is likewise advantageous, as has already been made clear by the above description of the state of the technology. In particular, the doing away with extensive and failure-prone gear drives as well as acquiring precision of the RPM even in the lower rotational speed ranges are advantages to be valued.

This precision permits running the spinning station as a "stand alone machine" with the corresponding demands for a high degree of precision. The installation of stepping motors for the individual drive of the withdrawal roll and/or the spool roll—if such individual drives are provided—is, because of the above mentioned grounds, also advantageous.

In a particularly preferred embodiment of the invention, the stepping motor for the paraffin roll is regulated by the lead stepping motor of the feed drum. A power control center delivers a signal through the frequency generator and over a line to the stepping motor for the paraffin roll. Should the feed drum, for instance, be turning at 10 RPM and if the frequency generator is set at a rotational speed ratio of 5:1, then the paraffin roll rotates at 2 RPM. Advantageously, in such an operation, small micro-step subdivisions per motor revolution are not necessary.

Advantageous developments of the invention are characterized by the features of the subordinate claims.

BRIEF DESCRIPTION OF THE DRAWING

In the following, an embodiment of the invention will be more closely described with the aid of the drawing.

FIG. 1 shows a spinning station 1 of a spinning machine schematically presented.

DETAILED DESCRIPTION

Reference will now be made in detail to the presently preferred embodiments of the invention, one or more examples of which are shown in the figures. Each example is provided to explain the invention, and not as a limitation of the invention. In fact, features illustrated or described as part of one embodiment can be used with another embodiment to yield still a further embodiment. It is intended that the present invention cover such modifications and variations.

A plurality of similar spinning stations 1 are customarily placed beside one another, which, in composite, form the spinning machine. In FIG. 1, the spinning station 1 possesses—in the direction of travel of the fiber band or sliver—in sequential array:

a feed drum 2;

a disintegrator 3;

a rotor 4;

a withdrawal roll 5;

a paraffin roll 6;

an auxiliary paraffining block 8; and a spool roll 7.

Emerging from a (not shown) draw frame, the fiber band or sliver B makes its way to the feed drum 2, which is circumferentially and axially corrugated and which conveys the fiber band B to the disintegrator roll or combing roll 3.

Equipped with circumferential comblike teeth 13, the disintegrator 3 separates the band B into individual fibers. By means of a funnel shaped conduit 14, and under a suction, the stream of individual fibers enters the rotor 4. The rotor 4 rotates, by means of a central drive for all rotors of the spinning machine, at speeds of rotation exceeding 100,000 RPM and spins the fibers into a yarn F. This yarn F is subsequently removed from the rotor by the withdrawal roll 5 together with roll 11 which exerts a rolling pressure on the withdrawal roll 5. After this removal, the yarn F is guided to frictional contact with the paraffin block 8 and then is transported by the paraffin roll 6, which turns at a low rate of speed. Continuing in motion, the yarn F is finally wound onto a spool 10 which is axially supported by a rotating core 9. The spool 10 lies with its own weight against the spool roll 7 and obtains its rotational energy therefrom.

The feed drum 2 is connected to an individual drive 12 designed as a stepping motor. In the embodiment presented in the figure, the withdrawal roll 5 is connected with a single drive 15, the paraffin roll 6 with a single drive 16 and the spool roll 7 with its own drive 17. The stepping motor for the feed drum 2 in the depicted embodiment is designed as a lead motor with a specifically set lead RPM or with a given lead frequency. This lead RPM determines the RPM of the remaining drives 15, 16 and 17. The speed of rotation of the motor 12 is controlled by a power control center 20, which with the input of either the specified lead frequency or the lead speed of rotation of the motor 12, transmits the respective frequencies (or RPM's) to the individual motors 15, 16, 17 by means of electrical lines 23, 25, 27. Between the power control center 20 and the individual drives 15, 16, 17, respectively, a frequency generator 22, 24, 26 is inserted into the circuit for the purpose of presetting to specific values the speeds of rotation of the single drives 15, 16, 17.

The individual drives 15, 16, 17 can be designed as stepping motors, in like manner to the individual drive 12 of the feed drum 2. Stepping motors have, in such an application, among other preferable features, the advantage that they possess no gear drives subject to wear and tear. The supposed disadvantage that stepping motors must be directly controlled is countered by the invention by simply providing a single power control center by means of which the rotational ratios derived from either the frequency or the RPM of a lead motor can be preset to specified values.

The single power control center 20 serves likewise for the power distribution to the individual drives 12, 15, 16, 17. Not only does this allow space to be saved within the spinning station, but also the expenditure in wiring and attendant labor within a spinning station can be held at a low level. The power control center 20 is, for instance, placed directly on the stepping motor 12 of the feed drum 2, possibly screwed onto the housing thereof. From this point, the electrical control lines 23, 25, 27 run respectively to the other individual drives associated with the given spinning station. The frequency generators 22, 24, 26 can likewise by incorporated into the power control center.

In an embodiment which is not illustrated, another motor is proposed as lead motor instead of the individual motor 12 of the feed drum 2. In the case of additional, not shown, embodiments, besides the individual motor 12 for the feed drum 2, simply one or two of the individual drives 15, 16, 17 are foreseen as the drive of one or two of the rolls 5, 6, 7. The possibility exists of using an individual drive 16 designed as a stepping motor for the paraffin roll 6 and controlling this drive by the individual drive 12 for the feed roll 2 by means of the power control center 20 as well as with the frequency generator 24. In this manner, no problems will arise upon startup of the paraffin roll 6, since lesser frictional force is to be overcome than is the case with the conventionally employed synchronous motor. Thus, an otherwise necessary, heavy inrush current at startup for the paraffin roll can be avoided. Moreover, a single drive 16 for the paraffin roll 6 shows little wear, so the maintenance and cleaning expenses are kept at a low level.

It will be appreciated by those skilled in the art that various modifications and variations can be made in the present invention without departing from the scope of the invention. It is intended that the present invention include such modifications and variations as come within the scope of the appended claims and their equivalents.

What is claimed is:

1. A spinning machine having a plurality of spinning stations, each spinning station comprising:
    a feed drum to transport a fiber band into said spinning station for processing into a yarn;
    an individual feed drum drive operably disposed to said feed drum, said feed drum drive rotating said feed drum at a specified rotational speed;
    a disintegrator roll operably configured with said feed drum, said disintegrator roll interacting with said fiber band in a manner that separates said fiber band into individual fibers;
    a rotor rotatable at a specified rotational speed, said rotor disposed to receive said fibers separated by said disintegrator roll, and spinning said fibers into a yarn;
    a withdrawal roll operably configured with said spinning station, said withdrawal roll removing said yarn formed in said rotor;
    a spool roll operably configured with said spinning station, said spool roll winding said yarn removed by said withdrawal roll on a bobbin operably disposed to said spool roll;
    wherein at least one of said withdrawal roll or said spool roll possesses an individual drive operably disposed to said respective roll, said drive rotating said respective roll at a specified rotational speed; and
    wherein said rotational speed of said individual feed drum drive and said rotational speed of said other individual drive are controlled by a preset rotational ratio such that a change in speed of one drive results in a corresponding change of speed in the other.

2. A spinning machine as in claim 1, wherein both said withdrawal roll and said spool roll possess an individual drive operably disposed to said respective rolls, said drives rotating said respective rolls at specified rotational speeds which is controllable as a function of said rotational ratio.

3. A spinning machine as in claim 1, further comprising a waxing roll disposed between said rotor and said spool roll in said yarn direction of travel, said waxing roll having wax configured thereto in a manner in which said wax contacts said yarn dispersing said wax on an outer surface of said yarn.

4. A spinning machine as in claim 3, further comprising an individual waxing roll drive operably disposed to said waxing roll, said waxing roll drive rotating said waxing roll at a specified rotational speed which is controllable as a function of said rotational ratio.

5. A spinning machine as in claim 1, wherein said waxing roll, said withdrawal roll, and said spool roll each possess an individual drive operably disposed to said respective rolls, said individual drives rotating said rolls at specified rotational speeds which are controllable as a function of said rotational ratio.

6. A spinning machine as in claim 1, further comprising a power control center configured with said spinning station, said power control center regulating and supplying electrical current to said individual drives.

7. A spinning machine as in claim 6, wherein said power control center is positioned near one of said individual drives.

8. A spinning machine as in claim 6, further comprising at least one frequency generator operably disposed between said power control center and said individual drives, said frequency generator implementing said preset rotational ratio of rotational speeds of said rolls.

9. A spinning machine as in claim 8, wherein one of said individual drives is a lead motor that operates at a preset rotational speed or frequency by which said rotational speeds of at least one of said other individual drives are determined using said rotational ratio.

10. A spinning machine as in claim 9, wherein said individual feed drum drive is designed as said lead motor.

11. A spinning machine as in claim 1, wherein at least one of said individual drives is designed as a stepping-motor.

12. A spinning machine having a plurality of spinning stations, each spinning station comprising:
    a feed drum to transport a fiber band into said spinning station for processing into a yarn;
    an individual feed drum drive operably disposed to said feed drum, said feed drum drive rotating said feed drum at a specified rotational speed;
    a disintegrator roll operably configured with said feed drum, said disintegrator roll interacting with said fiber band in a manner that separates said fiber band into individual fibers;
    a rotor rotatable at a specified rotational speed, said rotor disposed to receive said fibers separated by said disintegrator roll, and spinning, said fibers into a yarn;
    a withdrawal roll operably configured with said spinning station, said withdrawal roll removing from a rotor area said yarn formed in said rotor;
    a spool roll operably configured with said spinning station, said spool roll winding said yarn removed by said withdrawal roll on a bobbin operably disposed to said spool roll;
    a waxing roll disposed between said rotor and said spool roll in direction of travel of said yarn, said waxing roll having wax configured thereto in a manner in which said wax contacts said yarn dispersing said wax on an outer surface of said yarn;
    wherein at least one of said withdrawal roll, said spool roll, or said waxing roll possesses an individual drive operably disposed to said respective roll, said drive rotating said respective roll at a specified rotational speed; and wherein said rotational speed of said individual feed drum drive and said rotational speed of said other individual drive are controlled by a preset rotational ratio such that a change in speed of one drive results in a corresponding change of speed in the other.

13. A spinning machine as in claim 12, further comprising a power control center configured with said spinning station, said power control center regulating and supplying electrical current to said individual drives.

14. A spinning machine as in claim 13, wherein said power control center is positioned near one of said individual drives.

15. A spinning machine as in claim 13, further comprising at least one frequency generator operably disposed between said power control center and said individual drives, said frequency generator implementing said preset rotational ratios of rotational speeds of said rolls.

16. A spinning machine as in claim 15, wherein one of said individual drives is a lead motor that operates at a preset rotational speed or frequency by which said rotational speeds of at least one of said other individual drives are determined using said rotational ratio.

17. A spinning machine as in claim 16, wherein said individual feed drum drive is designed as said lead motor.

18. A spinning machine as in claim 12, wherein at least one of said individual drives is designed as a stepping-motor.

* * * * *

UNITED STATES PATENT AND TRADEMARK OFFICE
CERTIFICATE OF CORRECTION

| | | |
|---|---|---|
| PATENT NO. | : 6,412,266 B2 | Page 1 of 1 |
| APPLICATION NO. | : 09/747789 | |
| DATED | : July 2, 2002 | |
| INVENTOR(S) | : Anton Paweletz et al. | |

It is certified that error appears in the above-identified patent and that said Letters Patent is hereby corrected as shown below:

On the title page, please correct the DE reference number listed under "Foreign Patent Documents" to read as --2235686--.

Signed and Sealed this
Twenty-ninth Day of September, 2015

Michelle K. Lee
*Director of the United States Patent and Trademark Office*